US006987327B1

(12) United States Patent
Lucatero

(10) Patent No.: US 6,987,327 B1
(45) Date of Patent: Jan. 17, 2006

(54) ELECTRIC GENERATING CONVERTIBLE BICYCLE

(76) Inventor: Gerardo Ramos Lucatero, 2804 35th Ave., Sacramento, CA (US) 95824

(*) Notice: Subject to any disclaimer, the term of this patent is extended or adjusted under 35 U.S.C. 154(b) by 167 days.

(21) Appl. No.: 10/623,885

(22) Filed: Jul. 21, 2003

(51) Int. Cl.
*H02P 9/00* (2006.01)

(52) U.S. Cl. ........................ 290/1 A; 290/45; 180/205; 74/625

(58) Field of Classification Search ................ 290/1 R, 290/1 A, 1 C, 1 D, 45; 180/205, 206; 74/625
See application file for complete search history.

(56) References Cited

U.S. PATENT DOCUMENTS 3,921,741 A * 11/1975 Garfinkle et al. ........... 180/205
4,084,810 A * 4/1978 Forsman ........................ 482/5
4,512,567 A * 4/1985 Phillips ....................... 463/37
4,612,447 A * 9/1986 Rowe ......................... 290/1 R
4,637,274 A * 1/1987 Goldenfeld .................. 74/625
4,942,936 A * 7/1990 Gardner, Jr. ................ 180/207
6,703,716 B2 * 3/2004 Chiu .......................... 290/1 R

* cited by examiner

*Primary Examiner*—Nicholas Ponomarenko
(74) *Attorney, Agent, or Firm*—Risto A. Rinne, Jr.

(57) ABSTRACT

An apparatus for producing and storing electrical energy includes a conventional bicycle having a plurality of gear ratios and a generator that includes a drive roller on a shaft that is in frictional engagement with an outer circumference of a rear tire of the bicycle. The bicycle is adapted for stationary use with a stand or independent use without the stand and is capable of producing electricity in either case. The generator charges a battery that may be transported with the bicycle. An inverter converts DC into AC. A mass is optionally added to a bicycle crank or wheel to smooth out the pedaling process. A pivoting modified stand is described.

15 Claims, 3 Drawing Sheets

ELECTRIC GENERATING CONVERTIBLE BICYCLE

BACKGROUND OF THE INVENTION

1. Field of the Invention

The present invention, in general relates to electrical generators and, more particularly, to bicycles that are capable of generating electric energy when pedaled.

The use of a bicycle to generate electricity is, to some degree, known. However, current and prior designs have certain limitations.

For example, current known designs offer only one speed, thereby only one range of resistance, subject only to the speed of pedaling and the load on the generator. A wide range is required. For example, a young person of limited physical strength is in need of a gear ratio that permits as easy pedaling as possible (i.e., a high gear ratio resulting in less revolutions of the generator per revolution of the bicycle pedal). Whereas, a strong athletic person needs a much lower gear ratio if they are to receive a proper workout.

Therefore, there is a need for multiple speeds.

An additional problem that multiple speeds would solve is that it would permit a user to initiate usage by beginning in a low gear, one that is easy to pedal. As speed increases, the gear could be changed to accommodate the higher speed.

Also, if additional electrical load were placed on the system, the gear could be lowered for easier pedaling. This would allow the non-athletic person to utilize the system even when there was a substantial electrical load and therefore, substantial mechanical resistance.

Also, the way the alternator is driven is important for a variety of reasons. Prior art designs that utilize a belt drive, for example, waste energy. It also makes the bicycle difficult to disconnect, if necessary, from its charging station.

Accordingly, there is a need for an improved drive system.

There is also a need for a battery gauge to indicate the level of charge stored in a DC battery.

An especially important need is that of using the bicycle as a bicycle when it is desired, one that does not provide any resistance from the generator. To accomplish this, the bicycle must be readily separable from the stand (i.e., charging station) to which it is supported.

Another especially important need is that when a bicycle is being ridden on the road, there are times when it is desirable to generate electricity, for example, when coasting downhill, and times when it is inappropriate to generate electricity, for example, when pedaling up a steep hill. It is desirable to provide a bicycle that can be adjusted to generate and store electricity or not when it is being ridden on the road.

Another problem is that the load placed on the rider when generating electricity provides uneven resistance to pedaling. For example, when the pedals are straight up and down, it is especially difficult to maintain rotation of the crank (that part to which the pedals are attached).

Accordingly, there exists today a need for an electric generating convertible bicycle that helps to ameliorate the above-mentioned difficulties.

Clearly, such an apparatus would be a useful and desirable device.

2. Description of Prior Art

Generating systems are, in general, known. For example, the following patents describe various types of these devices:

U.S. Pat. No. 6,229,224 to Gagne, May 8, 2001;

U.S. Pat. No. 5,577,986 to Chen, Nov. 26, 1996;

U.S. Pat. No. 5,252,859 to Tagney, Jr., Oct. 12, 1993;

U.S. Pat. No. 5,050,865 to Auspurger et al., Sep. 24, 1991;

U.S. Pat. No. 4,389,047 to Hall, Jan. 21, 1983;

U.S. Pat. No. 4,298,893 to Holmes, Nov. 3, 1981; and

U.S. Pat. No. 3,210,634 to Stern, Oct. 5, 1965; and

Foreign Patent No. JP 357186006A to Nakamatsu, published date Nov. 16, 1982; and Foreign Patent No. DE 019515597A1 to Werfel, Rath, and Beyer, published date Nov. 28, 1996.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an electric generating convertible bicycle that is readily convertible from an electric generating station to a bicycle that is capable of being ridden.

It is also an important object of the invention to provide an electric generating convertible bicycle that includes a plurality of speeds for use in driving a generator.

Another object of the invention is to provide an electric generating convertible bicycle that includes a plurality of speeds for use in driving a generator which can be changed during use.

Still another object of the invention is to provide an electric generating convertible bicycle that includes a roller attached to a generator and adapted for contact with a rear wheel of the bicycle.

Still yet another object of the invention is to provide an electric generating convertible bicycle that includes a battery gauge.

Yet another important object of the invention is to provide an electric generating convertible bicycle that does not require a great deal of time to disconnect from a charging station for use as a conventional type of a bicycle.

Still yet another important object of the invention is to provide an electric generating convertible bicycle that can be used in remote locations or impoverished areas that do not have electricity available to generate conventional alternating current, such as 120 VAC.

Still one further important object of the invention is to provide an electric generating convertible bicycle that can be used for electrical generation needs during power outages.

Still one further useful object of the invention is to provide an electric generating convertible bicycle that can be used to generate and accumulate electrical energy when the bicycle is being ridden on the road.

Still one more further and useful object of the invention is to provide an electric generating convertible bicycle that can be adapted to generate and accumulate electrical energy when the bicycle is being ridden on the road at certain times under discretion of a rider and prevented from doing so at other times.

Still one additional object of the invention is to provide an electric generating convertible bicycle that includes a crank that had a mass attached thereto sufficient to add inertia to the crank.

Still one further object of the invention is to provide an electric generating convertible bicycle that includes a wheel that had a mass attached thereto sufficient to add inertia to the system.

Still a second further object of the invention is to provide an electric generating convertible bicycle that includes a stand that is adapted to convert by pivoting from a first position for use as a fixed electrical power generating station into a second position for use as a portable electrical power generating station.

Still a third further object of the invention is to provide an electric generating convertible bicycle that includes a stand that is adapted to convert by pivoting from a first position for use as a fixed electrical power generating station into a second position for use as a conventional bicycle.

Still a fourth further object of the invention is to provide an electric generating convertible bicycle that includes a modified pair of nuts on a rear axle that are adapted to secure a pivoting stand thereto.

Briefly, an electric generating convertible bicycle that is constructed in accordance with the principles of the present invention has a conventional generator/alternator with a roller attached to a shaft that is pivotally attached above a rear wheel of a multiple speed bicycle. The output of the generator is fed to a 12 volt battery. The output of the battery is provided to an inverter which supplies useful 120 VAC electrical power. The bicycle is adapted for stationary attachment to a generating station and is adapted for quick removal and for use on the road. A mass is attached to the crank thereby acting as a flywheel or to the rear wheel. A pivoting modified stand is described that permits pivoting of the stand from a first stationary position into a second mobile position. When the stand is disposed in the first stationary position the bicycle remains in a fixed position and is a self-contained electrical power generating and storage system. When the stand is disposed in the second mobile position the bicycle is a mobile self-contained electrical power generating and storage system that can be enabled for electrical power generation and storage or disabled by a flick of a switch.

DETAILED DESCRIPTION OF THE INVENTION

Figure 1:
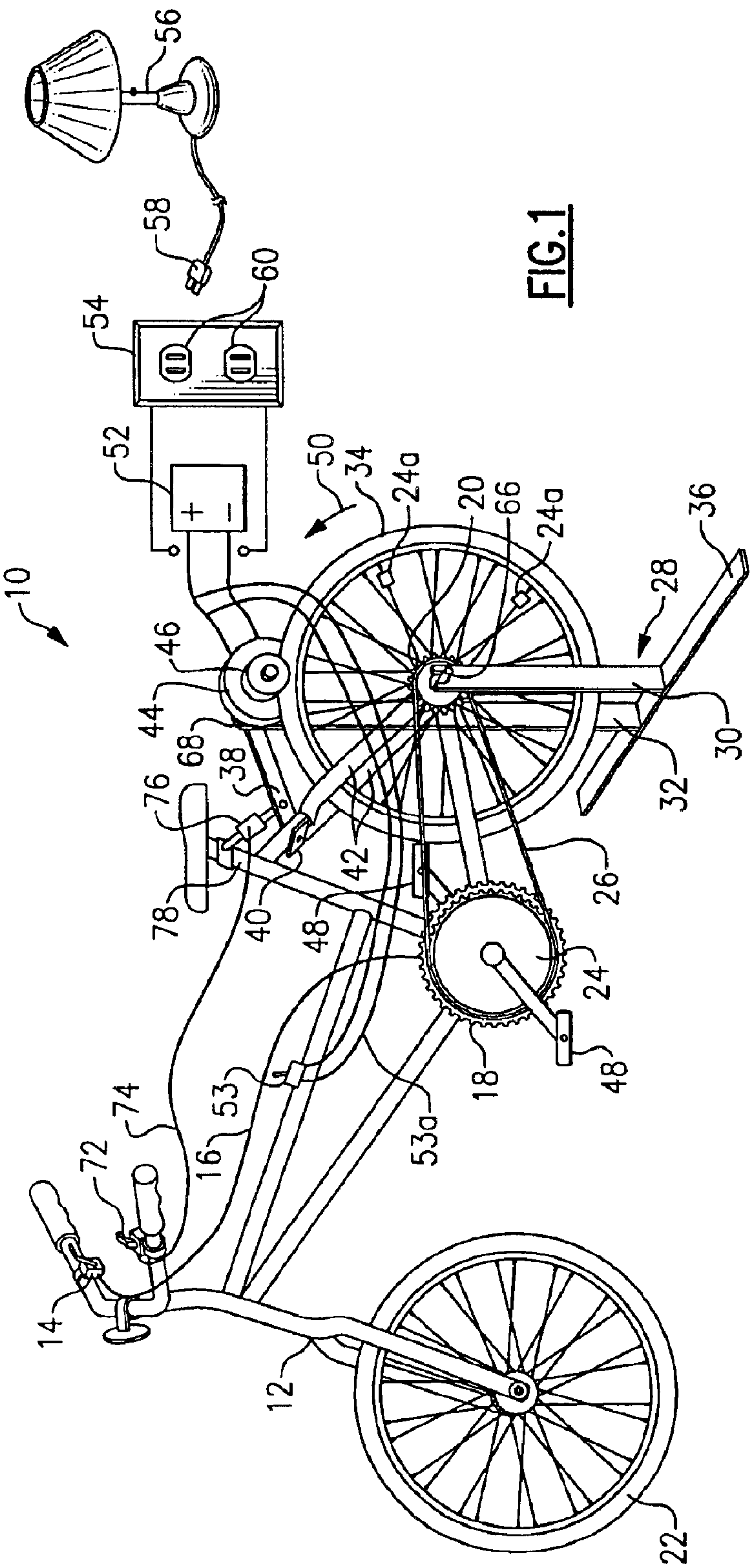
FIG. 1 is a view in perspective of an electric generating convertible bicycle on a generating station.

Referring to FIG. 1 is shown, an electric generating convertible bicycle that, identified in general by the reference numeral 10.

A conventional multiple speed bicycle 12 includes a gear selection lever 14 and cable 16 that leads to a drive gear 18 disposed on the far side of the bicycle 12. The cable 16 is used to change the drive gear 18 (larger to smaller or opposite) or alternatively, it goes to a driven gear 20 which is similarly changed. It may also go to an internal mechanism in the rear hub. What is important is that the bicycle 12 must include some method for changing an overall gear ratio when it is used.

The bicycle 12 includes a front wheel 22 that is in contact with a ground surface.

Attached to a shaft that is driven by, or drives, the drive gear 18 is a mass 24. The mass 24 adds rotational inertia to the drive gear 18 when it is being pedaled. The mass 24 can be attached to a crank, thereby acting as a flywheel. This smoothes out the generation of electrical power and it also provides a smoother ride on the road, an unexpected benefit that is described in greater detail hereinafter. A modified mass 24*a* may also be attached to a rear wheel 34 to further increase rotational inertia.

A chain 26 passes over the drive and driven gears 18, 20 as is well known in the bicycle arts.

A stand 28 includes a first upright member 30 and a second upright member 32 on an opposite side of the rear wheel 34.

The first upright member 30 and the second upright member 32 are attached (welded) to a bottom member 36 that rests on the ground surface (floor).

The stand 28 and its component parts are described in greater detail hereinafter.

A horizontal generator support member 38 is attached to a bracket 40 that clamps to a conventional pair of rear frame members 42 of the bicycle 12. The horizontal generator support member 38 helps retain a generator 44 in position over the rear wheel 34.

A roller 46 is attached to a shaft that drives the generator 44. The roller 46 is preferably about three inches in diameter and made of metal, rubber, urethane, or other material with a high coefficient of friction.

During use as a generator, the bicycle 12 is mounted by a rider (not shown) and the gear selection lever 14 is set to achieve the desired gear ratio. A pair of pedals 48 are then urged by the rider's feet to rotate in a conventional manner thereby causing the rear wheel 34 to rotate in the direction shown by arrow 50.

This causes the roller 46 to rotate in a direction opposite that of the arrow 50. Depending upon the gear ratio, the speed of pedaling, and the load experienced by the generator 44, a particular level of current and voltage is provided to a battery 52.

Voltage and current regulators, well known in the generating arts, can be attached to the generator 44 or contained within it.

Also, the term generator 44 is intended to include any device capable of generating electricity, for example any type of an alternator. Typically, the voltage that is produced by the generator 44 is regulated to approximately fourteen volts (to optimally charge a twelve volt lead-acid battery 52).

If a different type of a battery (not shown) is used, then the voltage produced is changed accordingly. The intention is to select the electrical components so as to produce a current and voltage output from the generator 44 that is optimally balanced to best charge the battery 52.

The output of the battery 52 (DC) is fed to an inverter 54. The inverter 54 converts or inverts the DC voltage and current input into a conventional alternating voltage and current output. This output will vary depending upon where the electric generating convertible bicycle 10 is used. In the U.S. an output of 120 VAC at 60 cycles per second is preferred.

A lamp 56 is shown with a conventional 120 VAC plug 58 for connection to a duplex receptacle 60 of the inverter 54. In this mode, the electric generating convertible bicycle 10 is stationary, it cannot move along the ground as it is supported by the stand 28 and its front wheel 22. When pedaled, electricity is generated and fed to the battery 52. This energy can be used simultaneous with the actual pedaling or it can be stored in the battery 52 for later use. It is also possible to disconnect the battery 52 from the inverter 54 if the 12 VDC output of the battery 52 is required (instead of the 120 VAC output of the inverter 54).

Figure 2:
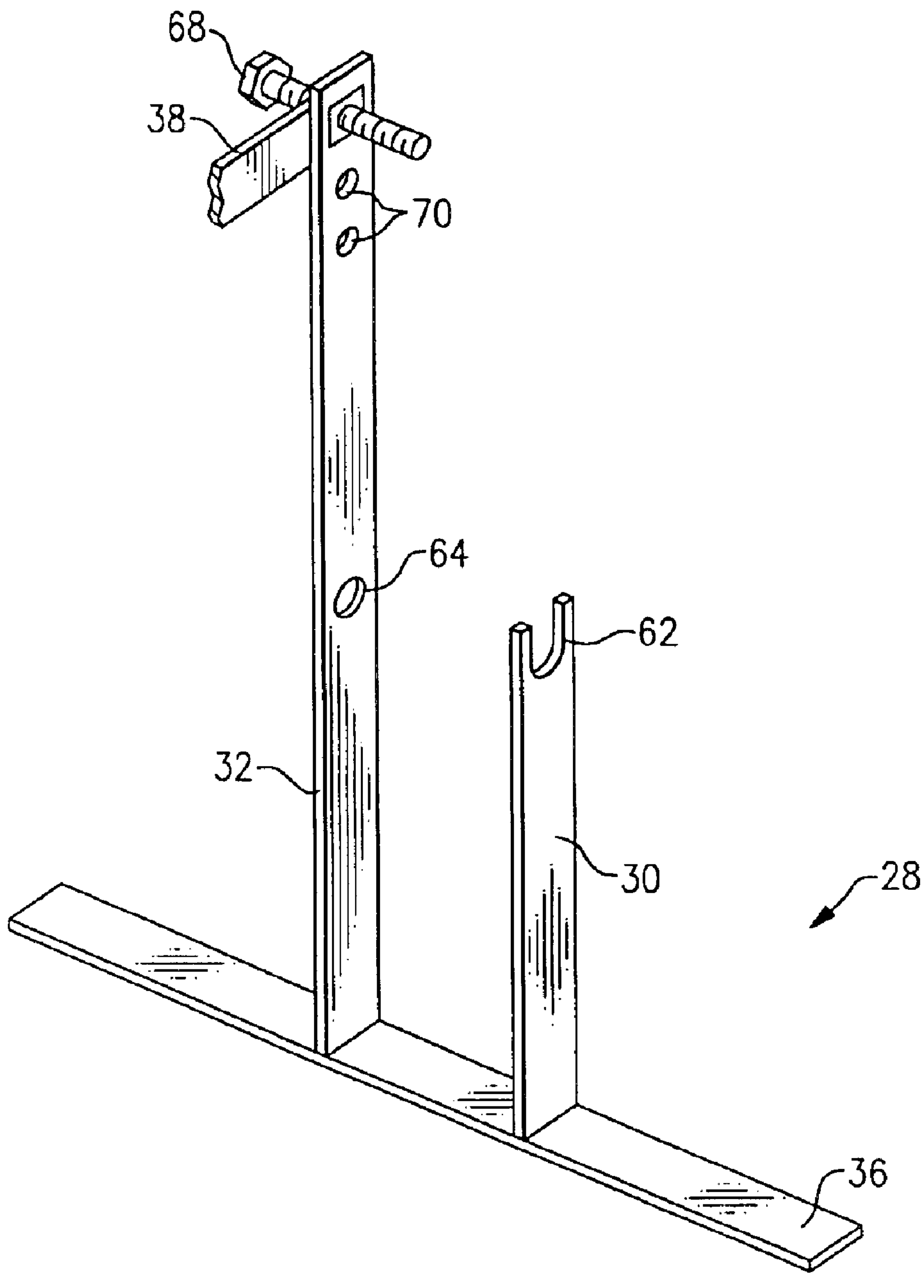
FIG. 2 is a view in perspective of a stand partially shown in FIG. 1.

Referring now also to FIG. 2, the first upright member 30 includes preferably a U-shaped opening 62 at the top. It could, of course, include a simple hole (not shown) instead of the U-shaped opening 62 for reasons as are described below. The second upright member 32 includes an axle hole 64 that is parallel (with respect to a height above the floor) to the U-shaped opening 64.

To attach the bicycle to the stand 28, an axle 66 on rear wheel 34 is loosened (i.e., two nuts [not shown] one on each side) and a distal one of the two nuts is removed. The axle 66, with the distal nut having first been removed, is placed through the axle hole 64. The opposite side (i.e., the proximate side as shown in FIG. 1) of the axle 66 is deposited on the U-shaped opening 62. The distal nut is then attached to the axle 66. Both nuts are then tightened thereby securing both the bicycle 12 frame and rear wheel 34 to the stand 28. If the U-shaped opening 62 is replaced by a second axle hole, then the axle 66 would have to be threaded through a hub of the rear wheel 34 as well as through both axles' holes 64.

The second upright member 32 extends upward beyond the axle 66 and intersects with an end of the horizontal support member 38. A bolt hole at the upper end of the second upright member 32 aligns with a bolt hole at the end of the horizontal support member 38. A generator bolt 68 passes through both holes and a hole in the generator 44 case to secure the generator 44 in position.

A triangle is formed by the second upright member 32, the horizontal support member 38 and the pair of rear frame members 42 that retain the generator 44 in the proper position so that proper amount of friction is maintained by the roller 46 on the outside surface of the tire on the rear wheel 34. The shape of the triangle can be changed by movement of the bracket 40 up or down along the rear frame members 42 and also by using a different mounting hole 70 that can also be provided in the second upright member 32. This is useful to accommodate bicycles 12 having different sizes for the rear wheel 34.

If desired, wing nut(s) can be used to retain the bracket 40 to the rear frame members 42. When the bicycle is to be removed from the stand 28 for "stand-alone" use as a conventional bicycle (i.e., ridden on the road), the nuts that retain the axle 66 are loosened as are the nuts or wing nuts that retain the bracket 40 to the pair of rear frame members 42. The bicycle 12 is removed from the stand 28, leaving all of the electrical components behind. The nuts that secure the axle 66 are tightened and the bicycle 12 is ready for independent use. To again install the bicycle on the stand 28, the process steps are repeated in reverse.

As such, an electric generating convertible bicycle 10 is provided. When attached to the stand 28 it can be used to charge the battery 52 for instantaneous or future use. When disconnected from the stand 28, it can be used for normal transportation. Changing the gear ratio provides optimum use both on the road and when charging the battery 52.

Referring again to FIG. 1, if desired, according to a modification the battery 52 can be downsized to include a smaller size and weight and attached to the bicycle 12, whether the bicycle 12 is on or off the stand 28. A simple plate and strap (not shown) attached to the horizontal support member 38, for example, could be used to retain the battery 52.

In this instance, when the bicycle 12 is detached from the stand 28, the horizontal support member 38 remains attached to the pair of pair of rear frame members 42. The generator bolt 68 is reinserted through the second upright member 32 and generator 44 casing to secure the generator 44 to the horizontal support member 38. The horizontal support member 38 is provided with a pivot axle at the bracket 40 so that it can rotate about the pivot axle to a small degree. When the horizontal support member 38 is pivoted upward, the generator 44 is elevated above the rear wheel 34 thereby removing contact of the roller 46 with the rear tire. When the horizontal support member 38 is pivoted downward, the generator 44 is lowered until contact of the roller 46 with the rear tire occurs, thereby causing friction of a rotating tire (when the bicycle 12 is being ridden on the street) to turn the roller 46 and produce electricity and charge the battery 52.

Another potentially simpler way is to include a switch 53 with a pair of electrical conductors 53*a* that can be closed (i.e., turned on) to complete an electrical circuit that adds a load or opened (i.e., turned off) to remove the load, the load being the battery 52 to charge.

A second lever 72 and a second cable 74 are provided. The second cable 74 is connected at one end to the second lever 72 and at an opposite end to an actuator 76. The actuator 76 is pivotally mounted to a seat post 78 at one end and to the horizontal support member 38 at an opposite end. Urging the second lever 72 in one direction shortens the overall length of the actuator 76 which causes the horizontal support member 38 to pivot upward and lift the generator 44 off of the rear tire. Urging the second lever 72 in an opposite direction as compared to the one direction lengthens the actuator which causes the horizontal support member 38 to pivot downward and press the roller 46 of the generator 44 into frictional contact with the rear tire.

As the rider travels, the second lever 72 is urged in the one direction to stop producing electricity and lighten the load and in the opposite direction to produce electricity and increase the load that is experienced. When the load is increased, this is experienced by the rider as an increase) in the force required to rotate the drive gear 18 and as is felt by the rider as more resistance on the pedals 48.

Accordingly, a method is disclosed whereby the bicycle 12 can be ridden normally on the street (i.e., road) and electricity can either be generated for charging the battery 52 or not, either mode being at the discretion of the rider. If the rider is straining to climb a hill, the second lever 72 is used to raise the generator 44 and instantaneously lighten the load the rider is experiencing. If the rider is coasting down a steep hill, the second lever 72 is lowered to engage and power the generator 44 thereby instantaneously increasing the load and providing a secondary or emergency source of additional braking (an unexpected benefit), while simultaneously generating electricity and storing it for later use.

This provides, especially for less developed areas of the world, an ability to use the bicycle 12 for normal daily commuting while simultaneously generating and storing electricity for subsequent connection to the inverter 54 and use. The bicycle 12 can be used as a mobile generator when it is separated from the stand 28 and modified as described so that it can carry the battery 52 and control the position of the generator 44 with respect to the rear wheel 34.

If desired, a battery gauge 80 is attached to the bicycle 12 and is electrically connected to the battery 52 to indicate the level of charge of the battery 52. This is useful because if the battery 52 had a full charge, the rider would not generally benefit (unless braking was needed) from engagement of the generator 44 with the rear wheel 34. The battery gauge 80 can be detached from the bicycle 12, if desired.

Figure 3:
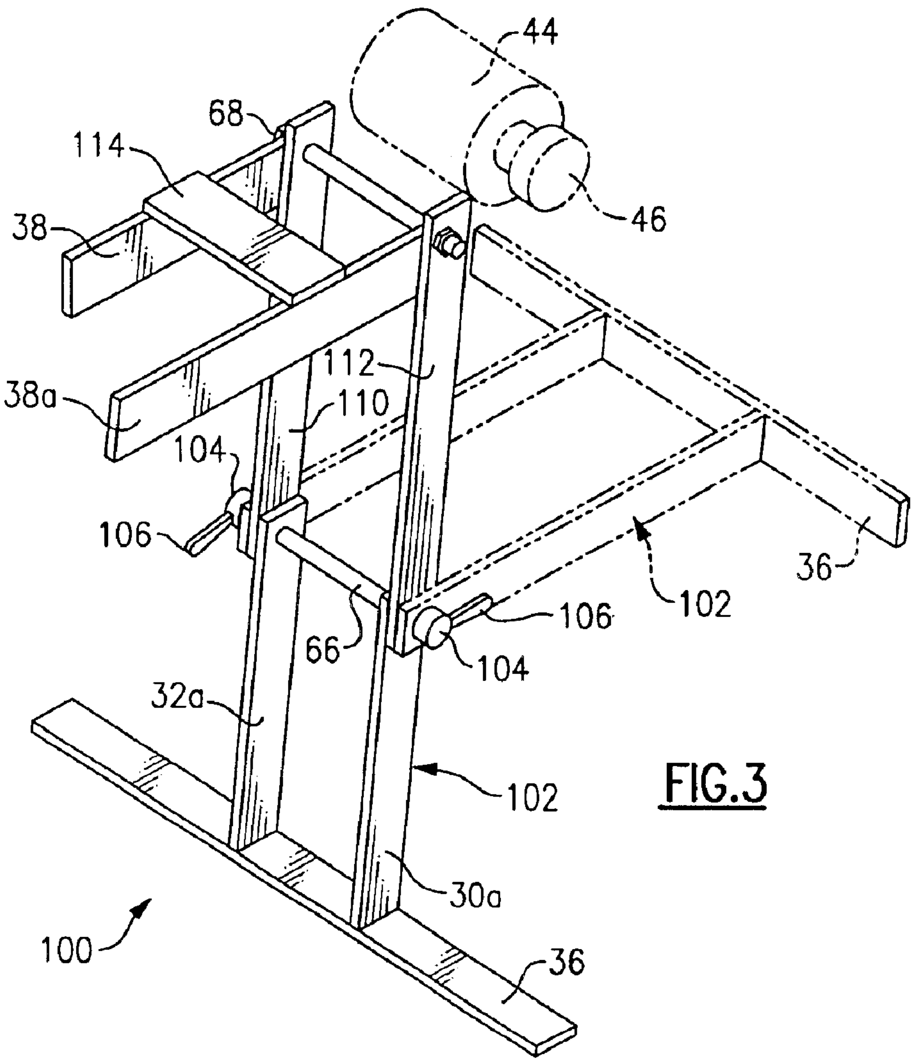
FIG. 3 is a view in perspective of an alternate embodiment of a stand partially shown in FIG. 1.

Referring now to FIG. 3, is shown an modified stand 100. The modified stand 100 is shown in a first position where the bottom member 36 is disposed on the ground. In the first position, the bicycle 12 (not shown in this view for added clarity of the modified stand 100) is adapted for stationary use as an electrical power generating station.

The bottom assembly 102 of the modified stand 100 is adapted to pivot into a second position where the bottom member 36 is raised above the ground, roughly at the same height above the ground as is the axle 66.

A modified first upright member 30*a* and a modified second upright member 32*a* each include a hole and are secured to the axle 66, as is described in greater detail below. The axle 66, it is noted, is a standard part that is supplied by the manufacturer of the bicycle 12 with the bicycle 12.

Figure 4:
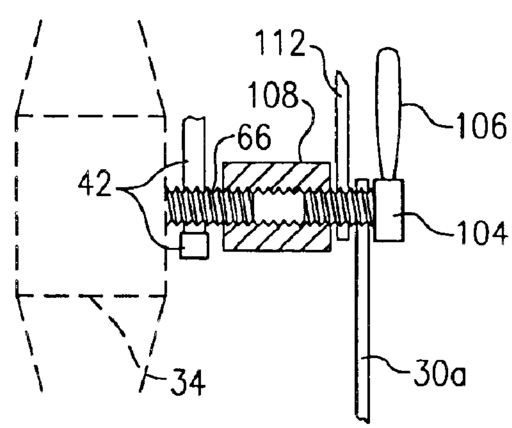
FIG. 4 is a view in cross-section of a portion of a rear axle bolt and modified nut assembly of the stand of FIG. 3.

However, the standard axle nuts are removed for use with the modified stand 100 and a pair of modified bolts 104 (see FIG. 4) are used. The modified bolts 104 each include, preferably, an extension handle 106 that is used to manually tighten or loosen each of the modified bolts 104. Each modified bolt 104 is threaded into a corresponding pair of modified elongated nuts 108, one elongated nut 108 being attached to each side of the axle 66.

To attach the modified stand 100 to the bicycle 12, each of the conventional nuts are removed from the axle 66 and one each of the elongated nuts 108 are attached to both sides of the axle sufficient to secure the rear wheel 34 to the rear frame members 42 of the bicycle 12.

Each elongated nut 108 includes an extension of the inner threads along its extended longitudinal axis (as compared to the nuts that were removed). The extended threads (of the proper pitch and direction of rotation) allow for entry at an opposite end of each elongated nut 108 of each of the modified bolts 104.

The modified bolts 104 pass through a pair of holes, one each in an upper end of the modified first upright member 30*a* and the modified second upright member 32*a* and through a pair of holes, one each in a lower end of a third upright member 110 and a fourth upright member 112.

To raise or lower the bottom assembly 102, each extension handle 106 is grasped on each side of the axle 66 and loosened about one turn sufficient to allow the bottom assembly 102 to pivot the bottom assembly 102 about the axis of the axle 66 into either the first or second position, as desired. Once pivoted, the extension handles 106 are used to tighten the bottom assembly 102 in position.

The third upright member 110 and the fourth upright member 112 extend upwards from the axle 66 to the horizontal generator support member 38 and to a parallel second support member 38*a* each of which are attached to the bracket 40 that clamps to the conventional pair of rear frame members 42. The generator 44 and the roller 46 are shown in dashed lines.

A battery plate 114 is attached intermediate the horizontal generator support member 38 and the second support member 38*a*. The battery 52 (and if desired, the inverter 54) are secured to the battery plate 114.

As such, the electric generating convertible bicycle 10 becomes a fully self-contained electrical energy generating and storage system that can be used in a stationary mode (i.e., when the modified stand 100 is in the first, lower position) and as a conventional road worthy bicycle 12 for commuting and the like (i.e., when the modified stand 100 is in the second, raised position).

Additionally, the bicycle 12 can be used to generate and store electricity when it is being ridden or it can be disabled from doing so, for example by flipping the switch 53 into an off (open) position.

If desired, the horizontal generator support member 38 and the second support member 38*a* can be modified to pivot (i.e., to lift the generator 44 off of the rear wheel 34) by use of the actuator 76.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An electric generating convertible bicycle, comprising:

a conventional bicycle of the type having a plurality of gears that can be varied by a rider during use of said bicycle;

a generator having a shaft and a roller operatively attached to said shaft, said roller adapted for frictional engagement with an outer circumferential surface of a rear tire of said bicycle; and means for maintaining said roller in frictional engagement with said outer circumferential surface; and wherein said means for maintaining includes a stand, said stand adapted to cooperate with an axle of a rear wheel of said bicycle sufficient to retain said rear wheel thereto and wherein said rear tire is elevated above a surface said stand is adapted to be placed on and wherein said stand includes a first and a second upright member and wherein said second upright member is attached at an upper end thereof to a distal end of a horizontal support member and to said generator and wherein said horizontal member includes an opposite end that is attached to a frame member of said bicycle and wherein said horizontal support member of said stand and said frame member cooperate to maintain said roller in sufficient frictional contact with said outer circumferential surface when said bicycle is disposed on said stand.

2. The electric generating convertible bicycle of claim 1 wherein said bicycle is adapted to be removed from said stand subsequent to a loosening of at least one nut on said axle and wherein said first upright member includes a U-shaped upper end that is adapted to receive said axle therein.

3. The electric generating convertible bicycle of claim 1 wherein said generator includes an electrical output that is operatively connected to an input of a storage battery and wherein said electrical output is adapted to charge said storage battery.

4. The electric generating convertible bicycle of claim 3 wherein said storage battery is distally located with respect to said bicycle.

5. The electric generating convertible bicycle of claim 3 wherein said storage battery is adapted to be carried on said bicycle when said bicycle is separated from said stand.

6. The electric generating convertible bicycle of claim 3 wherein said storage battery includes an output that is in parallel electrical connection with respect to said input and wherein said output of said storage battery is operatively connected to an inverter, said inverter converting a direct voltage and current into an alternating voltage and current.

7. The electric generating convertible bicycle of claim 1 wherein said means for maintaining said roller in frictional engagement with said outer circumferential surface includes a horizontal member that is pivotally attached at one end to a frame of said bicycle and at an opposite end to said generator, and wherein said horizontal member is adapted to pivot at said one end an amount that is sufficient to raise said opposite end and remove said roller from frictional engagement with said outer circumferential surface and wherein said horizontal member is adapted to pivot at said one end an amount that is sufficient to lower said opposite end and engage said roller into frictional engagement with said outer circumferential surface sufficient to cause said generator to produce an electrical energy and wherein said bicycle is adapted to be ridden in a conventional manner and said generator is adapted to produce said electrical energy and said battery is adapted to store at least a portion of said electrical energy.

8. The electric generating convertible bicycle of claim 7 including means adapted for said rider to raise and lower said opposite end of said horizontal member.

9. The electric generating convertible bicycle of claim 8 wherein said means adapted for said rider to raise and lower said opposite end includes a lever and a cable, said cable operatively attached to said lever at a first end and to an actuator at an opposite second end, and wherein when said lever is urged in a first direction said opposite end of said horizontal member is raised and when said lever is urged in a second opposite direction said opposite end of said horizontal member is lowered.

10. The electric generating convertible bicycle of claim 1 including a mass that is attached to a crank of said bicycle, said mass adapted to increase a rotational inertia of said crank and thereby smooth out the process of rotating said crank.

11. The electric generating convertible bicycle of claim 1 including a mass that is attached to a rear wheel of said bicycle, said mass adapted to increase a rotational inertia of said rear wheel and thereby smooth out the process of rotating said crank.

12. The electric generating convertible bicycle of claim 1 including a switch that is adapted to add an electrical load to said generator when said switch is in a closed position and to remove said electrical load when said switch is not in said closed position.

13. The electric generating convertible bicycle of claim 1 including a stand that is adapted to pivot about a longitudinal axis of a rear axle of said bicycle into a first lower position and wherein said bicycle is adapted for stationary use when said stand is disposed in said first lower position and wherein said stand is adapted to pivot from said first lower position into a second raised position wherein said bicycle is not adapted for stationary use when said stand is disposed in said second raised position.

14. The electric generating convertible bicycle of claim 13 including a pair of elongated nuts that are each attached to one end of said axle, wherein each of said elongated nuts include an extended length longitudinal inside thread that is adapted to cooperate with an end of said axle on one side each of said elongated nuts and to receive a portion of one of a pair of bolts on an opposite end of each of said elongated nuts, said each bolt adapted to secure a portion of one side of said stand to a corresponding side of said bicycle, and wherein when said pair of bolts are loosened, a lower assembly of said stand is adapted to pivot intermediate said first raised position and said second lower position and when said pair of bolts are tightened, said lower assembly of said stand is not adapted to pivot intermediate said first raised position and said second lower position.

15. The electric generating convertible bicycle of claim 14 including an extension handle attached to at least one of said pair of bolts, said extension handle providing sufficient leverage to permit a user to loosen or tighten said at least one of said pair of bolts.

* * * * *